United States Patent
Dave et al.

(10) Patent No.: US 10,678,194 B2
(45) Date of Patent: Jun. 9, 2020

(54) APPARATUS AND METHOD FOR ESTIMATING IMPACTS OF OPERATIONAL PROBLEMS IN ADVANCED CONTROL OPERATIONS FOR INDUSTRIAL CONTROL SYSTEMS

(71) Applicant: Honeywell International Inc., Morris Plains, NJ (US)

(72) Inventors: Sanjay K. Dave, Bangalore (IN); Andrew John Trenchard, Romsey (GB); Christopher J. Webb, Scottsdale, AZ (US); Matthew G. Grizzle, Phoenix, AZ (US); Mandar Vartak, Bangalore (IN); Sriram Hallihole, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 176 days.

(21) Appl. No.: 15/972,534

(22) Filed: May 7, 2018

(65) Prior Publication Data
US 2018/0356806 A1 Dec. 13, 2018

Related U.S. Application Data

(60) Provisional application No. 62/518,478, filed on Jun. 12, 2017, provisional application No. 62/518,352, (Continued)

(51) Int. Cl.
*G05B 13/04* (2006.01)
*G05B 19/4063* (2006.01)
(Continued)

(52) U.S. Cl.
CPC ......... *G05B 13/041* (2013.01); *G05B 19/406* (2013.01); *G05B 19/4063* (2013.01);
(Continued)

(58) Field of Classification Search
None
See application file for complete search history.

(56) References Cited

U.S. PATENT DOCUMENTS

| 5,351,184 A | 9/1994 | Lu et al. |
| 5,602,761 A | 2/1997 | Spoerre et al. |
| (Continued) | | |

FOREIGN PATENT DOCUMENTS

| WO | 0020939 A1 | 4/2000 |
| WO | 2004070569 A2 | 8/2004 |
| (Continued) | | |

OTHER PUBLICATIONS

International Search Report and Written Opinion of the International Searching Authority regarding International Patent Application No. PCT/US2016/031595 dated Aug. 18, 2016, 15 pages.

(Continued)

*Primary Examiner* — Ryan A Jarrett (57) ABSTRACT

A method includes obtaining data associated with operation of a model-based industrial process controller. The method also includes identifying at least one estimated impact of at least one operational problem of the industrial process controller, where each estimated impact is expressed in terms of a lost opportunity associated with operation of the industrial process controller. The method further includes presenting the at least one estimated impact to a user. The at least one estimated impact could include impacts associated with noise or variance in process variables used by the industrial process controller, misconfiguration of an optimizer in the industrial process controller, one or more limits on one or more process variables, a quality of at least one model used by the industrial process controller, a quality of one or more inferred properties used by the industrial (Continued)

process controller, or one or more process variables being dropped from use by the industrial process controller.

4 Claims, 6 Drawing Sheets

Related U.S. Application Data filed on Jun. 12, 2017, provisional application No. 62/518,397, filed on Jun. 12, 2017, provisional application No. 62/518,474, filed on Jun. 12, 2017.

(51) Int. Cl.
*G05B 19/406* (2006.01)
*G05B 19/418* (2006.01)
*G05B 23/02* (2006.01)

(52) U.S. Cl.
CPC ... *G05B 19/41885* (2013.01); *G05B 23/0272* (2013.01); *G05B 2219/23292* (2013.01); *G05B 2219/31359* (2013.01); *G05B 2219/37001* (2013.01)

(56) References Cited

U.S. PATENT DOCUMENTS

| | | | |
|---|---|---|---|
| 6,577,323 | B1 | 6/2003 | Jamieson et al. |
| 6,666,049 | B1 | 12/2003 | Katende et al. |
| 6,901,560 | B1 | 5/2005 | Guerlain et al. |
| 7,421,374 | B2 | 9/2008 | Zhan et al. |
| 8,108,790 | B2 | 1/2012 | Morrison, Jr. et al. |
| 8,185,217 | B2 | 5/2012 | Thiele |
| 9,715,221 | B2 | 7/2017 | Zheng et al. |
| 2004/0049299 | A1 | 3/2004 | Wojsznis et al. |
| 2005/0075738 | A1 | 4/2005 | Attarwala |
| 2005/0137721 | A1 | 6/2005 | Attarwala |
| 2005/0149208 | A1 | 7/2005 | Harmse et al. |
| 2005/0171626 | A1 | 8/2005 | Schwarm |
| 2007/0225835 | A1 | 9/2007 | Zhu |
| 2007/0268122 | A1 | 11/2007 | Kow et al. |
| 2007/0276512 | A1 | 11/2007 | Fan et al. |
| 2008/0065242 | A1 | 3/2008 | Attarwala |
| 2008/0140227 | A1 | 6/2008 | Attarwala |
| 2008/0243289 | A1 | 10/2008 | Yelchuru et al. |
| 2008/0244449 | A1 | 10/2008 | Morrison et al. |
| 2009/0043546 | A1 | 2/2009 | Srinivasan et al. |
| 2009/0204245 | A1* | 8/2009 | Sustaeta ............... G05B 13/024 700/99 |
| 2009/0287319 | A1 | 11/2009 | Attarwala |
| 2009/0319059 | A1 | 12/2009 | Renfro et al. |
| 2010/0082396 | A1 | 4/2010 | Caldwell et al. |
| 2010/0156654 | A1 | 6/2010 | Bullemer et al. |
| 2010/0241247 | A1 | 9/2010 | Attarwala |
| 2011/0130850 | A1 | 6/2011 | Zheng et al. |
| 2011/0258568 | A1 | 10/2011 | Pandurangan et al. |
| 2013/0317629 | A1 | 11/2013 | Shapiro et al. |
| 2014/0330402 | A1 | 11/2014 | Keenan et al. |
| 2014/0344007 | A1 | 11/2014 | Shende et al. |
| 2015/0134647 | A1 | 5/2015 | Sayyarrodsari et al. |
| 2015/0371418 | A1 | 12/2015 | Laycock et al. |
| 2016/0234242 | A1 | 8/2016 | Knapp et al. |
| 2016/0349740 | A1* | 12/2016 | Niemiec ............ G05B 23/0286 |
| 2017/0357240 | A1 | 12/2017 | Stewart et al. |
| 2018/0032940 | A1 | 2/2018 | Trenchard et al. |

FOREIGN PATENT DOCUMENTS

| | | |
|---|---|---|
| WO | 2007067645 A2 | 6/2007 |
| WO | 2009120362 A2 | 10/2009 |
| WO | 2013087973 A1 | 6/2013 |

OTHER PUBLICATIONS

Martin et al., "Estimating control function benefits," Hydrocarbon Processing 69, 1991, pp. 68-73.
Webb et al., "Using Advanced Control to Monitor Unit Performance and Economics," American Institute of Chemical Engineers, 2018 Spring Meeting and 14th Global Congress on Process Safety, Apr. 2018, 21 pages.
Trenchard et al., "Apparatus and Method for Identifying Impacts and Causes of Variability or Control Giveaway on Model-Based Controller Performance", U.S. Appl. No. 15/973,272, filed May 7, 2018, 70 pages.
Vartak et al., "Apparatus and Method for Identifying, Visualizing, and Triggering Workflows From Auto-Suggested Actions to Reclaim Lost Benefits of Model-Based Industrial Process Controllers", U.S. Appl. No. 15/972,535, filed May 7, 2018, 37 pages.
Trenchard et al., "Apparatus and Method for Automated Identification and Diagnosis of Constraint Violations", U.S. Appl. No. 15/972,432, filed May 7, 2018, 55 pages.

* cited by examiner

APPARATUS AND METHOD FOR ESTIMATING IMPACTS OF OPERATIONAL PROBLEMS IN ADVANCED CONTROL OPERATIONS FOR INDUSTRIAL CONTROL SYSTEMS

CROSS-REFERENCE TO RELATED APPLICATIONS AND PRIORITY CLAIM

This application claims priority under 35 U.S.C. § 119(e) to the following U.S. provisional patent applications:

U.S. Provisional Patent Application No. 62/518,352 filed on Jun. 12, 2017;

U.S. Provisional Patent Application No. 62/518,397 filed on Jun. 12, 2017;

U.S. Provisional Patent Application No. 62/518,474 filed on Jun. 12, 2017; and

U.S. Provisional Patent Application No. 62/518,478 filed on Jun. 12, 2017.

All of these provisional applications are hereby incorporated by reference in their entirety.

TECHNICAL FIELD

This disclosure relates generally to industrial process control and automation systems. More specifically, this disclosure relates to an apparatus and method for estimating impacts of operational problems in advanced control operations for industrial control systems.

BACKGROUND

Industrial process control and automation systems are often used to automate large and complex industrial processes. These types of control and automation systems routinely include process controllers and field devices like sensors and actuators. Some of the process controllers typically receive measurements from the sensors and generate control signals for the actuators.

Model-based industrial process controllers are one type of process controller routinely used to control the operations of industrial processes. Model-based process controllers typically use one or more models to mathematically represent how one or more properties within an industrial process respond to changes made to the industrial process. Unfortunately, the benefits that can be obtained using model-based controllers often decline over time. This can be due to a number of factors, such as inaccurate models, misconfiguration, or operator actions. In some extreme cases, the benefits that could be obtained using model-based controllers can be reduced by up to fifty percent or even more over time.

SUMMARY

This disclosure provides an apparatus and method for estimating impacts of operational problems in advanced control operations for industrial control systems.

In a first embodiment, a method includes obtaining data associated with operation of a model-based industrial process controller. The method also includes identifying at least one estimated impact of at least one operational problem of the industrial process controller, where each estimated impact is expressed in terms of a lost opportunity associated with operation of the industrial process controller. The method further includes presenting the at least one estimated impact to a user.

In a second embodiment, an apparatus includes at least one interface configured to receive data associated with operation of a model-based industrial process controller. The apparatus also includes at least one processor configured to identify at least one estimated impact of at least one operational problem of the industrial process controller and to present the at least one estimated impact to a user. Each estimated impact is expressed in terms of a lost opportunity associated with operation of the industrial process controller.

In a third embodiment, a non-transitory computer readable medium contains instructions that when executed cause at least one processing device to obtain data associated with operation of a model-based industrial process controller. The medium also contains instructions that when executed cause the at least one processing device to identify at least one estimated impact of at least one operational problem of the industrial process controller, where each estimated impact is expressed in terms of a lost opportunity associated with operation of the industrial process controller. The medium further contains instructions that when executed cause the at least one processing device to present the at least one estimated impact to a user.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, model-based industrial process controllers are one type of process controller routinely used to control the operations of industrial processes. Model-based process controllers can help to improve the performance of continuous or other industrial processes. For example, in industrial processes, a controlled variable (CV) generally represents a process variable that can be measured or inferred and that is ideally controlled to be at or near a desired setpoint or within a desired range of values. A manipulated variable (MV) generally represents a process variable that can be adjusted in order to alter one or more controlled variables. A disturbance variable (DV) generally represents a process variable whose value can be considered but cannot be controlled. As a simple example, a flow rate of material through a pipe could denote a controlled variable, a valve opening for a valve that controls the flow rate of material could denote a manipulated variable, and an ambient temperature around the pipe or the valve could denote a disturbance variable.

The implementation of model-based control often requires substantial investments of time, money, and effort. Even with high initial costs, however, the general expectation is that these costs can be recouped through use of these types of controllers within months if not weeks of implementation. Sustaining the performance of model-based controllers can be important for realizing the benefits that these types of controllers promise. Unfortunately, the performance of a model-based controller often deteriorates over time due to a number of factors. These factors include equipment degradation, changes in the operations of the process and the controller, operator actions, and artificially-constrained operating conditions. Without proper maintenance, model-based controllers may fail to provide any benefits and fall into disuse after some time.

Maintenance of model-based controllers often requires experienced and trained engineers, who can be in short supply. It is also often difficult for a few control engineers to maintain all of the model-based controllers at an entire site. Monitoring applications are increasingly being used to help control engineers detect problems quickly and diagnose probable causes. These applications provide key performance indicators (KPIs) to help the control engineers detect problems. However, even with conventional model-based controllers and monitoring tools, various industries still face a number of challenges. For example, many of the key performance indicators in conventional monitoring tools are very technical and require additional skills to understand and interpret in order to take effective actions. Also, with skilled personnel in short supply, it is often useful or important to prioritize issues in terms of financial impacts, but current monitoring tools do not provide this insight. In addition, it may be difficult for process operations teams to understand model-based controllers and monitoring tools and to contribute and participate in maintaining the controllers, and it may be difficult for operations managers to provide essential oversight.

This disclosure provides various techniques for identifying the impacts of operational problems involving a model-based controller in an industrial control and automation system. The impacts here can be measured against the maximum benefit potential that could be obtained using the model-based controller. In other words, the impacts can represent measures of how the current operation of the model-based controller falls below the theoretical best operation of the model-based controller. The impacts can be expressed in various ways. In some embodiments, the impacts are expressed in terms of economic impacts, such as monetary losses. An impact can be referred to as a "cost of lost opportunity" in this document, meaning the impact measures the cost of not operating the model-based controller at its full potential. Of course, the impacts from not operating the model-based controller at its full potential could be expressed in other ways, such as excess material usage, excess energy usage, or reduced product production. The "cost" referred to in a "cost of lost opportunity" can also serve as a measure of the excess material usage, excess energy usage, reduced product production, or other impact.

In this way, these techniques help to identify different operational issues that can affect a model-based controller and the impacts of those operational issues. Whether expressed in material or energy usage, product production, economic terms, or other terms, the impacts of the operational issues can be ranked or otherwise used to identify issues that affect the model-based controller and that might need further investigation or resolution. The impacts can also be used to justify such investigation or resolution, such as when the costs of the economic or other impacts outweigh the costs of the investigation or resolution.

Among other things, this could enable a new Industrial Internet of Things (IIoT) service or other service to be deployed, where the service can be used to reduce the cost of troubleshooting a model-based controller's performance and to improve the lifecycle benefits of the model-based controller. In particular embodiments, these techniques could be implemented using a computer program that periodically analyses batches of data collected from customers' premises as part of a cloud-based analytics solution. The resulting analysis conclusions could then be visualized to the customers using cloud-hosted dashboards to enable the customers, support engineering teams, or other personnel to view performance information and troubleshoot performance issues. Of course, other implementations of the described functionality could also be used.

Figure 1:
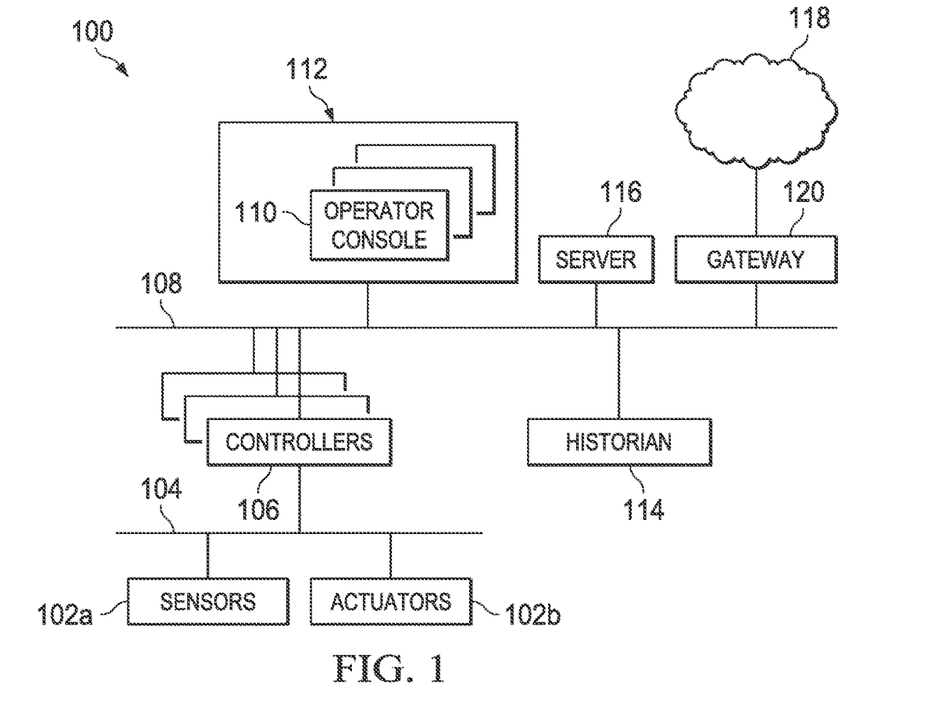
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as flow, pressure, or temperature. Also, the actuators 102b could alter a wide variety of characteristics in the process system, such as valve openings. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network (such as one supporting a FOUNDATION FIELDBUS protocol), electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control (MPC) or other advanced predictive control (APC). As a particular example, each controller 106 could represent a computing device running a real-time operating system, a WINDOWS operating system, or other operating system.

At least one of the controllers 106 shown in FIG. 1 could denote a model-based controller that operates using one or more process models. For example, each of these controllers 106 could operate using one or more process models to determine, based on measurements from one or more sensors 102a, how to adjust one or more actuators 102b. In some embodiments, each model associates one or more manipulated or disturbance variables (often referred to as independent variables) with one or more controlled variables (often referred to as dependent variables). Each of these controllers 106 could use an objective function to identify how to adjust its manipulated variables in order to push its controlled variables to the most attractive set of constraints.

At least one network 108 couples the controllers 106 and other devices in the system 100. The network 108 facilitates the transport of information between components. The network 108 could represent any suitable network or combination of networks. As particular examples, the network 108 could represent at least one Ethernet network.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving setpoints or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here may optionally include at least one historian 114 and/or one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120.

At least one component of the system 100 could support a mechanism for estimating impacts in advanced control operations for industrial control systems. For example, this functionality could be implemented in an operator console 110, a server 116, or a computing cloud 118 or remote server. Among other things, this functionality can be used to evaluate data associated with one or more model-based controllers 106 to identify operational issues with the controller(s) 106, and the impacts of the identified operational issues can be determined. Visualizations can also be provided, such as on displays of the operator consoles 110, to help users identify the operational issues and their impacts. Ideally, this allows the operational issues to be prioritized and reduced or resolved, which can help to improve the operation of the model-based controllers 106. Additional details regarding this functionality are provided below.

There are various ways in which this functionality can be used in order to support modifications to the operations of model-based controllers 106 or underlying industrial processes. For example, in one example use case, this functionality can be used to provide a view of the top improvement opportunities for an industrial site, along with the associated costs to operations or other impacts in decreasing order of value. This allows site managers or other personnel to identify the best potential improvements that could be made to the industrial site. In another example use case, this functionality can be used to identify the long-term performance of model-based controllers in terms of total value, along with references to benchmark performance and maximum possible performance. This allows engineers or other personnel to identify controllers that are most in need of tuning or other maintenance. As yet another example use case, this functionality can be used to identify actionable metrics, such as in terms of the cost of lost opportunity per controller. This allows engineers or other personnel to focus on the most impactful problems. As still another example use case, this functionality can be used to calculate the cost of lost opportunity in a vendor-neutral way since these approaches can be used with model-based multivariable controllers from different suppliers. This allows managers, engineers, or other personnel to evaluate controller performance across multiple vendors in a consistent way. Of course, the functionality described in this patent document could be used in any other suitable manner.

Although FIG. 1 illustrates one example of an industrial process control and automation system 100, various changes may be made to FIG. 1. For example, the system 100 could include any number of sensors, actuators, controllers, networks, operator consoles, control rooms, historians, servers, and other components. Also, the makeup and arrangement of the system 100 in FIG. 1 is for illustration only. Components could be added, omitted, combined, further subdivided, or placed in any other suitable configuration according to particular needs. As a particular example, the historian 114 may be implemented in the computing cloud 118. Further, particular functions have been described as being performed by particular components of the system 100. This is for illustration only. In general, control and automation systems are highly configurable and can be configured in any suitable manner according to particular needs. In addition, FIG. 1 illustrates one example operational environment where impacts in advanced control operations for industrial control systems can be estimated. This functionality can be used in any other suitable system.

Figure 2:
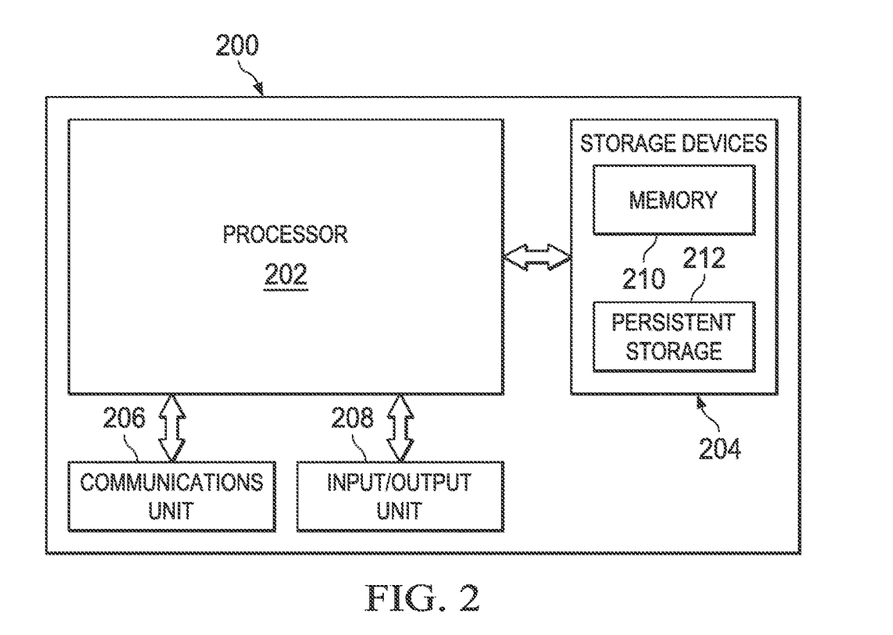
FIG. 2 illustrates an example device for estimating impacts in advanced control operations for industrial control systems according to this disclosure.

FIG. 2 illustrates an example device 200 for estimating impacts in advanced control operations for industrial control systems according to this disclosure. The device 200 could, for example, denote an operator console 110, server 116, or device used in the computing cloud 118 described above with respect to FIG. 1. However, the device 200 could be used in any other suitable system.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. The instructions could estimate the impacts in advanced control operations as described in this patent document. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates one example of a device 200 for estimating impacts in advanced control operations for industrial control systems, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Figure 3:
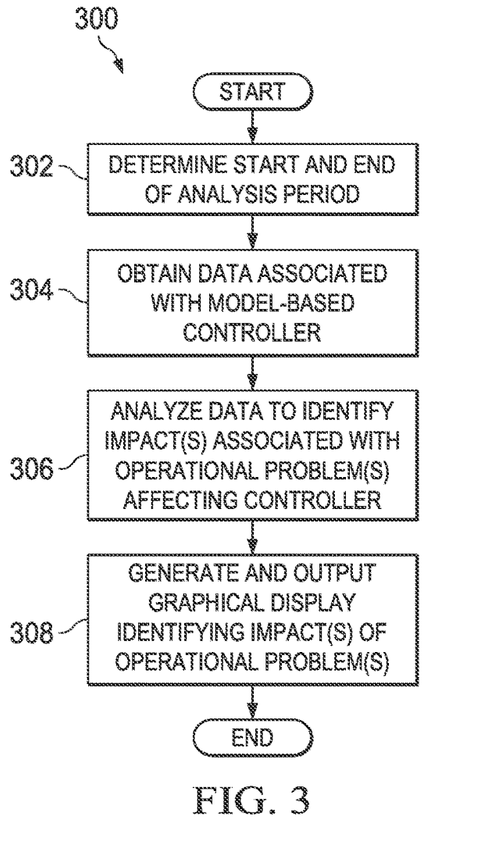
FIG. 3 illustrates an example method for estimating impacts in advanced control operations for industrial control systems according to this disclosure.

FIG. 3 illustrates an example method 300 for estimating impacts in advanced control operations for industrial control systems according to this disclosure. For ease of explanation, the method 300 is described as being performed by the device 200 of FIG. 2 implementing an operator console 110, server 116, or device used in the computing cloud 118 of FIG. 1. However, the method 300 could be used with any suitable device and in any suitable system.

As shown in FIG. 3, a start and an end of an analysis period are identified at step 302. This could include, for example, the processor 202 of the device 200 determining the period during which data associated with a model-based controller 106 will be analyzed. Any suitable period of time could be identified here, such as a particular day, week, month, or other period of time. Data associated with the model-based controller is obtained at step 304. This could include, for example, the processor 202 of the device 200 obtaining data identifying process variable values associated with the controller 106 during the identified analysis period. This could also include the processor 202 of the device 200 pre-processing the data, such as to validate the obtained data and discard any portions of the obtained data deemed invalid. Note that when the data is obtained by a device that is remote from the controller 106 or other data source, the data can be transmitted to the device securely and in real-time, near real-time, or non-real-time depending on the embodiment.

The data can be analyzed continuously, periodically, or at other suitable times to identify at least one impact associated with one or more operational problems affecting the controller at step 306. This could include, for example, the processor 202 of the device 200 analyzing the data to determine whether the model-based controller 106 is suffering from any constraint/limit issues, model quality issues, inferential quality issues, variable mode issues, optimizer configuration issues, or process variable noise/variance issues. These issues are described in more detail below. In general, each operational problem that is identified can affect the operation of the model-based controller 106 and prevent the controller 106 from achieving the most beneficial operation possible. This could also include the processor 202 of the device 200 determining a measure of how much each of the identified operational problems prevents the model-based controller 106 from achieving the most beneficial operation possible. As noted above, the impacts could be expressed in any suitable terms, such as excess material usage, excess energy usage, reduced product production, or lost economic costs (and the lost economic costs could themselves be a measure of things like excess material usage, excess energy usage, or reduced product production).

A graphical display identifying one or more impacts for one or more of the operational problems is generated and presented to one or more users at step 308. This could include, for example, the processor 202 of the device 200 generating a graphical user interface that identifies the operational problems and associated impacts. The operational problems could be presented in any suitable manner, such as when ranked by increasing or decreasing impacts.

Although FIG. 3 illustrates one example of a method 300 for estimating impacts in advanced control operations for industrial control systems, various changes may be made to FIG. 3. For example, while shown as a series of steps, various steps in FIG. 3 could overlap, occur in parallel, occur in a different order, or occur any number of times.

The following describes specific types of operational issues that can affect a model-based controller and how impacts of those specific types of operational issues can be identified. Note, however, that the operational issues and impacts described below are merely examples of the types of operational issues and impacts that could be identified using the techniques disclosed in this patent document. Any other or additional types of operational issues and impacts could be identified without departing from the scope of this disclosure.

In many instances, model-based controllers have the ability to consider a large number of process variables when determining how to control an industrial process. In order to identify which process variables to consider when attempting to control the industrial process, a model-based controller often attempts to solve an optimization problem. An example optimization problem that could be solved by a model-based controller could be expressed as:

$$\min \frac{1}{2} \|\varphi\|_2^2 \qquad (1)$$

where:

$$\varphi = \Sigma_i \alpha_i^*(y_i - y_{io})^2 + \beta_i^* y_i + \Sigma_j \alpha_j^*(u_j - u_{jo})^2 + \beta_j^* u_j \qquad (2)$$

subject to:

$$y_{li} \le y_i \le y_{hi} \qquad (3)$$

$$u_{lj} \le u_j \le u_{hj} \qquad (4)$$

Here, $\varphi$ represents the computed value of the objective function. Also, $y_i$ represents the current value of the $i^{th}$ controlled variable, $y_{io}$ represents the ideal resting value for the $i^{th}$ controlled variable, $y_{hi}$ represents the high limit (constraint) for the $i^{th}$ controlled variable, and represents the low limit (constraint) for the $i^{th}$ controlled variable. Further, $u_j$ represents the current value of the $j^{th}$ manipulated variable, $u_{jo}$ represents the ideal resting value for the $j^{th}$ manipulated variable, $u_{hj}$ represents the high limit (constraint) for the $j^{th}$ manipulated variable, and $u_{lj}$ represents the low limit (constraint) for the $j^{th}$ manipulated variable. In addition, $\alpha_i$ and $\alpha_j$ respectively represent quadratic costs for the $i^{th}$ controlled variable and the $j^{th}$ manipulated variable, and $\beta_i$ and $\beta_j$ respectively represent linear costs for the $i^{th}$ controlled variable and the $j^{th}$ manipulated variable.

As noted above, various issues can affect a model-based controller 106 and result in reductions to the benefits of model-based control. As a result, the benefits that can be obtained using a model-based controller can fall over time (in some cases very significantly). The issues that can affect a model-based controller 106 include constraint/limit issues, model quality issues, inferential quality issues, variable mode issues, optimizer configuration issues, and process variable noise/variance issues. Limit issues can arise due to incorrect or over-constrained limits placed on manipulated variables and/or controlled variables, such as the $y_{hi}$, $y_{li}$, $u_{hj}$, and $u_{lj}$ limits noted above. Limit issues can alternatively arise due to equipment processing limits or other physical throughput limitations of the equipment itself.

Model quality issues can arise since industrial processes are often nonlinear and time-variant, while models of industrial processes used by model-based controllers are typically Linear Time Invariant (LTI). Thus, a controller's dynamic response and a solution from the controller's embedded optimizer can be affected when an industrial process drifts, such as due to changes in feed quality, operating points, ambient conditions, and other operating conditions. Also, inaccuracies in the models when generated can degrade the controller's response and misdirect the controller's optimizer.

Inferential quality issues can arise since soft sensors or inferred properties are used quite frequently as controlled variables in model-based controllers as proxies for laboratory or analyzer values. Many inferred properties limits or inferred quality specifications are frequently constraints to optimization. As a result, the quality of an inference can have a direct impact on the benefits that can be achieved by model-based controllers. Inferential quality issues can therefore be caused when the quality of inferred values is poor.

Variable mode issues can arise since some process variables may be excluded or dropped from consideration by model-based controllers. For example, due to various transient issues, an operator may remove one or more process variables from a controller's control matrix. This prevents the controller 106 from considering those process variables during the calculation of its objective function values or other optimization calculations. In some cases, process variables may be removed from the controller's control matrix for extended periods of time, and the controller's operation in such conditions can become sub-optimal.

Optimizer configuration issues can arise since, in many model-based controllers, the "costs" of variables for optimization or objective coefficients may not represent actual real (monetary) costs. In some cases, these costs are entered and used merely to give directions to the process variables. Even when costs that are entered are real monetary costs, they may not be updated with changes in market values or changes in modes of operation. As a result, this may cause the optimizer to not target a true optimum value in economic terms.

Process variable noise/variability issues can arise when the values of process variables excessively change due to noise or other issues. Noise or variance in controlled variables can be caused by various factors, such as measurement noise, underlying manipulated variable PID controller oscillations, or high variance in measured or unmeasured disturbance variables. In some cases when the controller 106 is tuned aggressively, high variance can also be due to mismatch between a controller's model and the actual industrial process. Mismatch may also be due to nonlinearity, which can result in limit cycling of the controller 106. One impact of high noise and variance is that a model-based controller 106 can push the average values of its controlled variables away from their associated limits in order to maintain the controlled variables within their limits. It may be more ideal to push those controlled variables to their limits.

The following discussions of FIGS. 4A through 7 describe example techniques for identifying or measuring the impacts of these types of operational issues that may affect a model-based controller 106. In these examples, it is assumed that a "shadow" optimizer is available for use. The shadow optimizer represents a "digital twin" of a model-based controller's optimizer. In other words, a replica of the functionality of the controller's optimizer can be used during the analysis. The shadow optimizer can be executed by any suitable device within or outside of a control and automation system, such as by an operator console 110, server 116, or device used in the computing cloud 118 described above with respect to FIG. 1.

In some embodiments, the data used by a shadow optimizer could be substantially the same data used by the embedded optimizer in one or more model-based controllers 106, and that data could have any suitable collection frequency or frequencies. In other embodiments, the data used by a shadow optimizer could be averaged data that is used by the embedded optimizer in one or more model-based controllers 106, such as hourly average values or data averaged at higher or lower frequencies. In addition to the controller data and gain matrix used by a model-based controller 106, the following data could be provided to the shadow optimizer. The prices of feeds, products, raw materials, and utilities at the boundary of an industrial site could be used, and the prices could be sourced from an enterprise resource planning (ERP) application or any other suitable source(s). Also, the ideal limits of process variables could be used, and the ideal limits could be sourced from boundary management software (which defines an operating envelope), from an initial benefit study used to justify the model-based controller, or from any other suitable source(s).

In particular embodiments, when true prices for all product streams are available, the shadow optimizer could be set up as a Product Value Optimizer (PVO). PVO refers to an optimization when true process economics are directly entered into the controller as either independent variables or dependent variables. In other particular embodiments, the shadow optimizer could be augmented with additional controlled variables if the original model-based controller 106 is not designed as a PVO. In the absence of true prices for all product streams, in some instances the shadow optimizer could be set up based on indicative cost coefficients for some units, such as when an operating margin per unit feed can be used as an alternative cost coefficient.

Figure 4A:
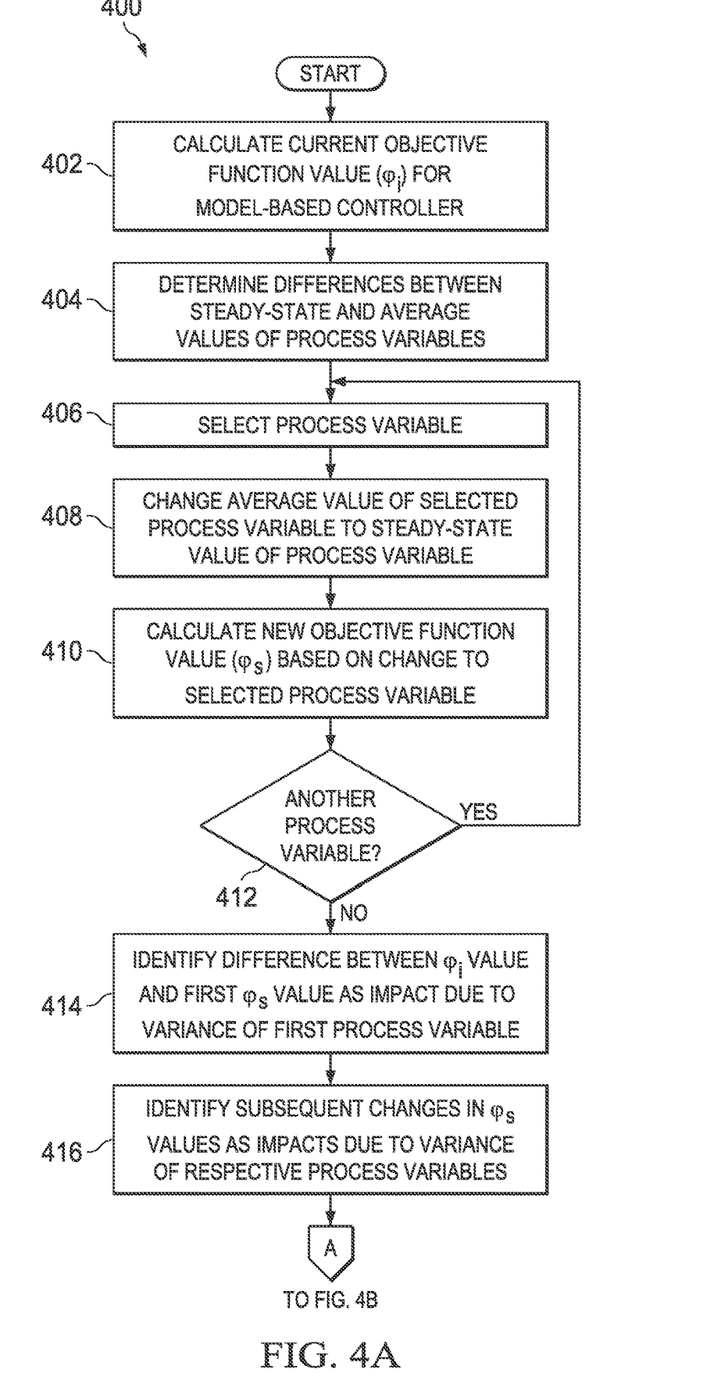
FIGS. 4A and 4B illustrate an example method for estimating impacts of constraint issues, optimizer configuration issues, and process variability issues in advanced control operations according to this disclosure.
Figure 4B:
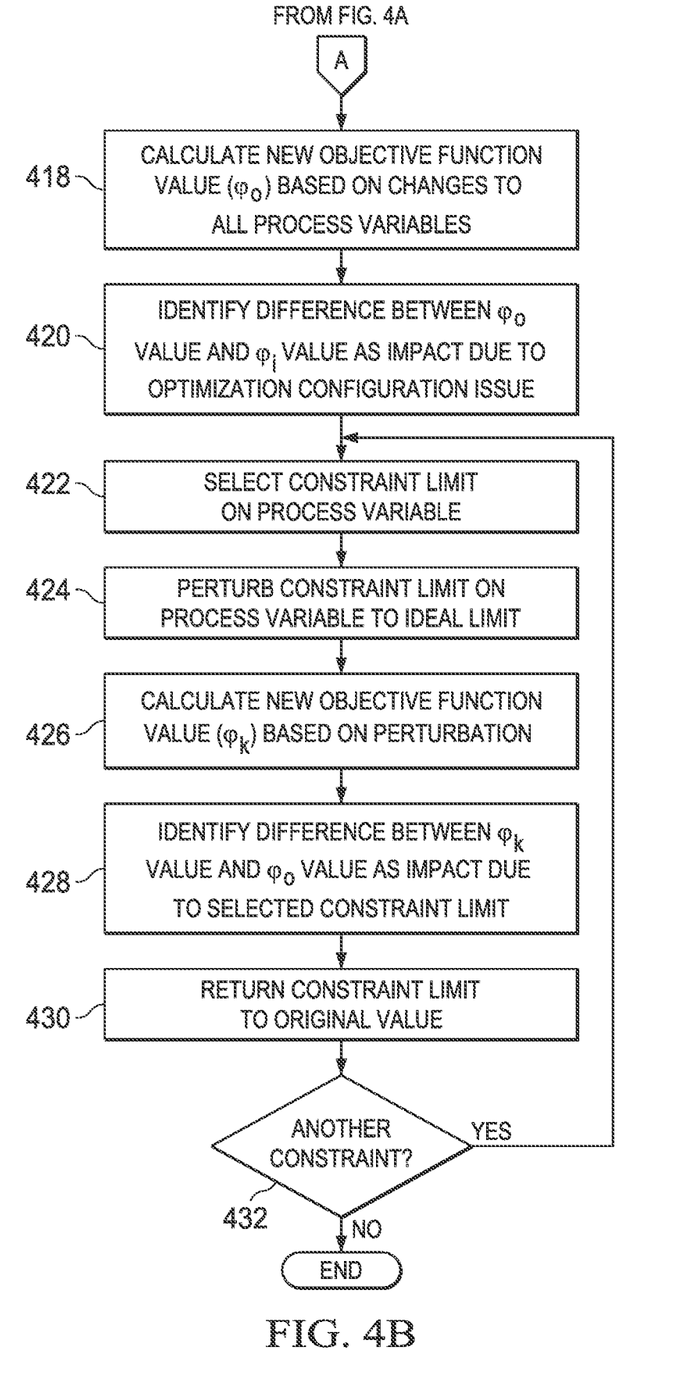

FIGS. 4A and 4B illustrate an example method 400 for estimating impacts of constraint issues, optimizer configuration issues, and process variability issues in advanced control operations according to this disclosure. The method 400 could, for example, be performed as part of step 306 in FIG. 3. For ease of explanation, the method 400 is described as being performed by the device 200 of FIG. 2 implementing an operator console 110, server 116, or device used in the computing cloud 118 of FIG. 1. However, the method 400 could be used with any suitable device and in any suitable system.

As shown in FIGS. 4A and 4B, a current value ($\varphi_i$) of a model-based controller's objective function is calculated at step 402. This could include, for example, the processor 202 of the device 200 calculating the current objective function value using the shadow optimizer. The current value of the controller's objective function could be based on (i) one or more real prices for one or more products and (ii) data and limits collected from an industrial site. Differences between steady-state and average values for one or more process variables associated with the model-based controller's objective function are determined at step 404. This could include, for example, the processor 202 of the device 200 identifying the steady-state and average values for each process variable contained in the controller's objective function based on the data collected from the model-based controller 106.

A first of the process variables is selected at step 406. This could include, for example, the processor 202 of the device 200 identifying the first process variable associated with the controller's objective function. The average value of the selected process variable is changed to equal the steady-state value of the selected process variable at step 408, and a new value ($\varphi_s$) of the controller's objective function is calculated at step 410. This could include, for example, the processor 202 of the device 200 setting the average value of the selected process variable to the process variable's steady-state value. This could also include the processor 202 of the device 200 using the shadow optimizer to calculate the value of the controller's objective function using the changed average value of the selected process variable. If another process variable remains to be selected at step 412, the process returns to step 406. In general, steps 406-412 iterate through a list of process variables and sequentially change each process variable's average value to its steady-state value. The results from these steps include a sequence of $\varphi_s$ values identifying how the value of the controller's objective function changed due to the process variable changes.

A difference between the $\varphi_i$ value and the first $\varphi_s$ value is identified as the impact caused by variance of the first process variable at step 414, and subsequent changes in the $\varphi_s$ values are identified as the impacts caused by variance of the subsequent process variables at step 416. This could include, for example, the processor 202 of the device 200 calculating the difference between the $\varphi_i$ value and the first $\varphi_s$ value and using this value as the cost of lost opportunity or other impact for variance of the first process variable selected in step 406. This could also include the processor 202 of the device 200 calculating the changes between the $\varphi_s$ values and using the changes as the costs of lost opportunity or other impacts for variance of the sequence of process variables following the first variable selected in step 406.

A new value ($\varphi_o$) of the model-based controller's objective function is calculated at step 418. This could include, for example, the processor 202 of the device 200 using the shadow optimizer to calculate the value of the controller's objective function using all process variables set to their steady-state values. A difference between the $\varphi_o$ value and the $\varphi_i$ value is identified as the impact caused by optimizer configuration issues at step 420. This could include, for example, the processor 202 of the device 200 calculating the difference between the $\varphi_o$ value and the $\varphi_i$ value and using this value as the cost of lost opportunity or other impact for the optimizer configuration issues. This value measures the combined effects of how the controller's optimizer fails to allow its process variables' average values to reach their steady-state values.

A constraint limit (high or low) on one of the process variables is selected at step 422, and the constraint limit is perturbed or changed to its ideal limit at step 424. This could include, for example, the processor 202 of the device 200 selecting one of the current constraints for a process variable contained in the controller's objective function and the associated ideal value for that constraint. As noted above, the ideal value could be identified previously, such as from management software or an initial benefit study. A new value ($\varphi_k$) of the controller's objective function is calculated based on the updated limit at step 426. This could include, for example, the processor 202 of the device 200 using the shadow optimizer to calculate the value of the controller's objective function using the modified constraint value. A difference between the $\varphi_k$ value and the $\varphi_o$ value is identified as the impact caused by the selected constraint limit at step 428. This could include, for example, the processor 202 of the device 200 calculating the difference between the $\varphi_k$ value and the $\varphi_o$ value and using this value as the cost of lost opportunity or other impact for the selected constraint limit. The selected constraint limit is returned to its original value at step 430. If any additional constraints for any of the process variables remain to be processed at step 432, the method returns to step 422 to select another constraint.

It should be noted that during steps 422-432, the cost of lost opportunity or other impact for a selected constraint limit could be calculated assuming that the ideal value for the selected constraint limit is not bound by existing equipment processing limits or other physical throughput limitations of the equipment itself. Thus, the impact for the selected constraint limit could be used as an indicator of whether larger or other non-constricting or less-constricting equipment could be used in place of the existing equipment in order to obtain process improvements. This functionality can be referred to as "debottlenecking" since it aims to relax equipment processing limits that can act as bottlenecks in an industrial process.

The final results from the method 400 include an identification of impacts caused by variability of the process variables, impacts caused by the optimizer's configuration, and impacts caused by the controller's current constraints. Of course, only a subset of these impacts may be needed or desired in a particular implementation, in which case the corresponding calculations in the method 400 could be omitted.

Figure 5:
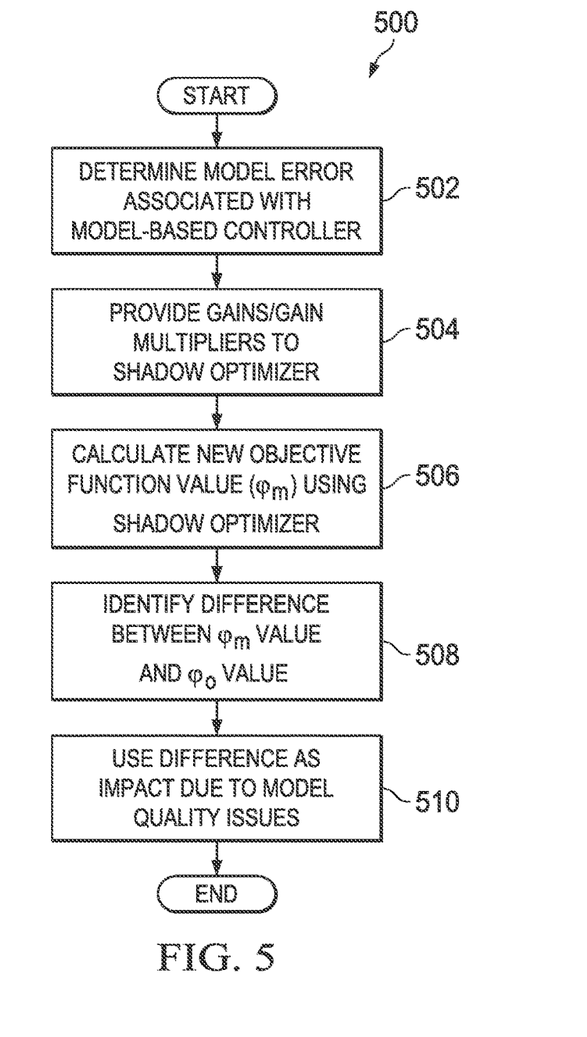
FIG. 5 illustrates an example method for estimating impacts of model quality issues in advanced control operations according to this disclosure.

FIG. 5 illustrates an example method 500 for estimating impacts of model quality issues in advanced control operations according to this disclosure. The method 500 could, for example, be performed as part of step 306 in FIG. 3. For ease of explanation, the method 500 is described as being performed by the device 200 of FIG. 2 implementing an operator console 110, server 116, or device used in the computing cloud 118 of FIG. 1. However, the method 500 could be used with any suitable device and in any suitable system.

As shown in FIG. 5, model error associated with a model-based controller is identified at step 502. This could include, for example, the processor 202 of the device 200 identifying the quality of one or more models used by the controller 106 to represent the behavior of at least one underlying industrial process. In particular embodiments, this may include the processor 202 of the device 200 identifying corrected gains or gain multipliers using the techniques described in U.S. Pat. No. 7,421,374 (which is hereby incorporated by reference in its entirety). Gains or gain multipliers obtained during the identification of the model error are provided to the shadow optimizer at step 504. This could include, for example, the processor 202 of the device 200 inserting the gains or gain multipliers into the control matrix of the shadow optimizer.

A new value ($\varphi_m$) of the controller's objective function is calculated at step 506. This could include, for example, the processor 202 of the device 200 using the shadow optimizer to calculate the value of the controller's objective function using the updated gains or gain multipliers. A difference between the $\varphi_m$ value and the coo value is identified at step 508, and the difference is used as the impact caused by model quality issues at step 510. This could include, for example, the processor 202 of the device 200 calculating the difference between the $\varphi_m$ value and the $\varphi_o$ value and using this value as the cost of lost opportunity or other impact for the model quality issues. This value measures the combined effects of how the controller's model fails to accurately match the actual behaviors of the underlying industrial process.

The final results from the method 500 include an identification of impacts caused by model quality issues associated with a model-based controller's model(s). Note that during this process, the original constraint limits used by the controller 106 can be maintained (rather than being changed to their ideal limits) so that the quantification of any model quality issues is independent of the quantification of the limit issues (as identified in the method 400). Also, it is possible to repeat the analysis of the limit issues using the method 400 after the corrected gains or gain multipliers are provided to the model-based controller 106 so that any limit issues remaining after the gains or gain multipliers have been corrected can be identified.

Figure 6:
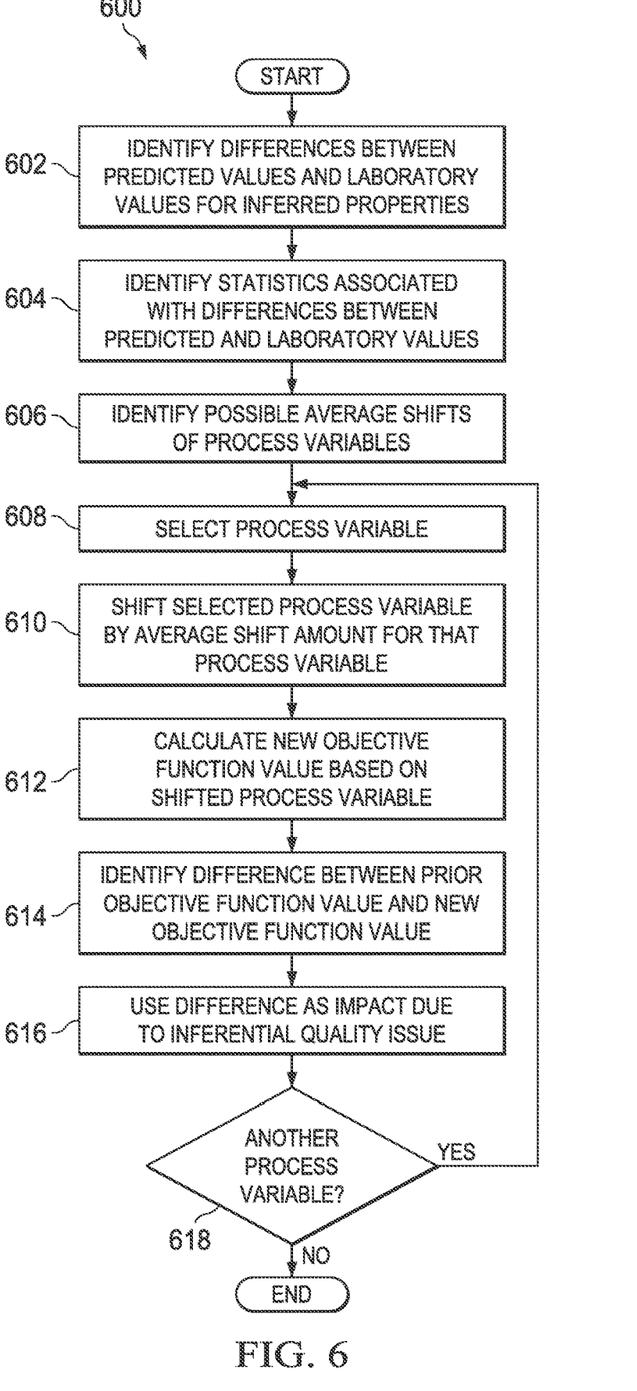
FIG. 6 illustrates an example method for estimating impacts of inferential quality issues in advanced control operations according to this disclosure.

FIG. 6 illustrates an example method 600 for estimating impacts of inferential quality issues in advanced control operations according to this disclosure. The method 600 could, for example, be performed as part of step 306 in FIG. 3. For ease of explanation, the method 600 is described as being performed by the device 200 of FIG. 2 implementing an operator console 110, server 116, or device used in the computing cloud 118 of FIG. 1. However, the method 600 could be used with any suitable device and in any suitable system.

Inferential properties or soft sensors can have various issues, such as high variance and/or high bias. For example, many inferential properties are provided with updates from a laboratory or analyzer. When an update does not occur, there may be no conventional way to figure out the issue(s) with the inferential properties or soft sensors. If generated inferential measurements are not noisy and lack high variability of bias between laboratory and predicted values, successive bias updates can gradually reduce the offset between the laboratory and predicted values. If the generated inferential measurements have a high variability of bias, it can result in high controlled variable variability. High bias variability can be due to prediction variability or laboratory variability.

As shown in FIG. 6, differences between predicted and laboratory values for one or more inferred properties are identified at step 602. This could include, for example, the processor 202 of the device 200 obtaining the predicted and laboratory values for each inferred property used in the controller's objective function. This data could be obtained from any suitable source(s), such as directly from the model-based controller 106 or indirectly, such as via a historian 114, server 116, or gateway 120. At least some of this data could also be obtained using the shadow optimizer. The length of time spanned by the data values here could be an extended period of time, such as ten days or more. Statistics associated with the bias (the identified differences) are calculated at step 604. This could include, for example, the processor 202 of the device 200 calculating the average, standard deviation, or other descriptive statistics of the bias.

Possible average shifts to the various process variables used by the controller are identified using the bias statistics at step 606. This could include, for example, the processor 202 of the device 200 determining how much the controller 106 could move its process variables away from their average values towards their constraint limits. Example techniques for identifying possible shifts to the process variables are described in the various provisional patent applications incorporated by reference above, as well as in U.S. Patent Application No. 62/518,397, entitled "APPARATUS AND METHOD FOR IDENTIFYING IMPACTS AND CAUSES OF VARIABILITY OR CONTROL GIVE-AWAY ON MODEL-BASED CONTROLLER PERFORMANCE" (filed concurrently herewith).

One of the process variables is selected at step 608. This could include, for example, the processor 202 of the device 200 selecting one of the process variables associated with the controller's objective function. The selected process variable is shifted by the average shift amount for that process variable at step 610. This could include, for example, the processor 202 of the device 200 increasing or decreasing the value of the selected process variable by the average shift amount identified in the previous step so that the selected process variable is at or closer to its constraint.

A new value of the controller's objective function is calculated at step 612. This could include, for example, the processor 202 of the device 200 using the shadow optimizer to calculate the value of the controller's objective function using the shifted process variable value. A difference between the new value of the controller's objective function and a prior value of the controller's objective function is identified at step 614, and the difference is used as the impact caused by an inferential quality issue at step 616. This could include, for example, the processor 202 of the device 200 calculating the difference between the objective function values and using this value as the cost of lost opportunity or other impact for the inferential quality issue.

If another process variable remains to be processed at step 618, the method returns to step 608 to select and process another process variable. The final results from the method 600 include an identification of impacts caused by inferential quality issues associated with inferred properties used by a model-based controller 106.

Figure 7:
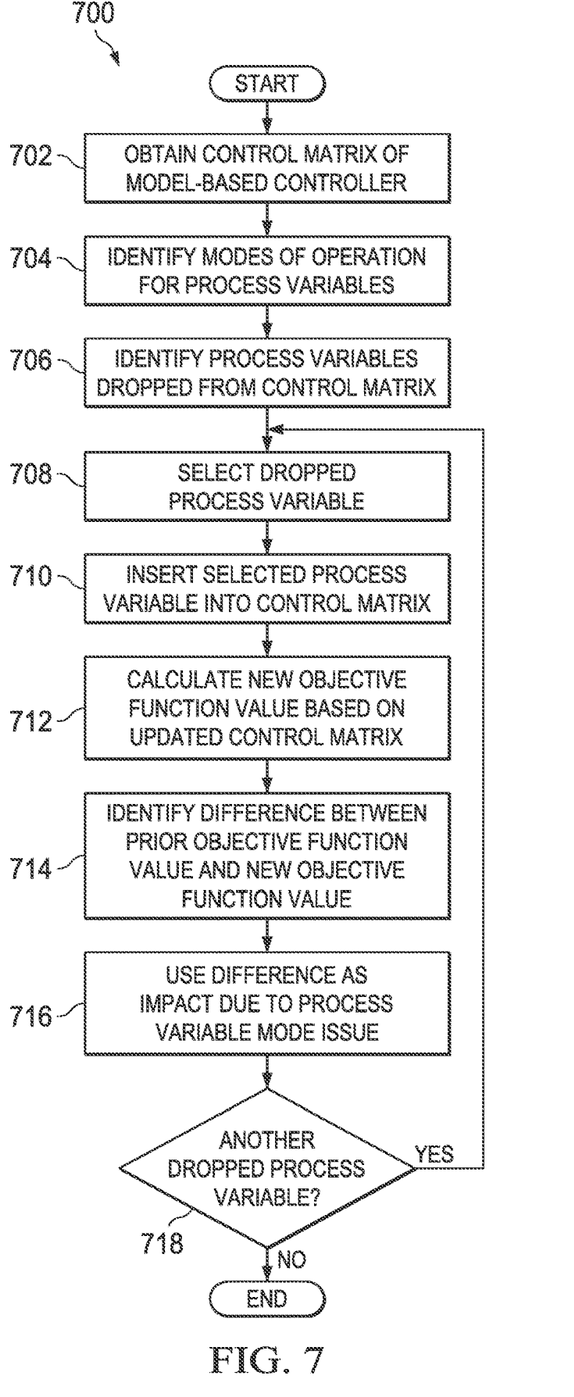
FIG. 7 illustrates an example method for estimating impacts of process variable mode issues in advanced control operations according to this disclosure.

FIG. 7 illustrates an example method 700 for estimating impacts of process variable mode issues in advanced control operations according to this disclosure. The method 700 could, for example, be performed as part of step 306 in FIG. 3. For ease of explanation, the method 700 is described as being performed by the device 200 of FIG. 2 implementing an operator console 110, server 117, or device used in the computing cloud 118 of FIG. 1. However, the method 700 could be used with any suitable device and in any suitable system.

As shown in FIG. 7, a control matrix of a model-based controller is obtained at step 702. This could include, for example, the processor 202 of the device 200 obtaining the control matrix from any suitable source(s). The control matrix generally identifies the manipulated and controlled variables that the controller 106 is currently able to consider or use when controlling an industrial process.

Current modes of operation for various process variables associated with the model-based controller are identified at step 704. This could include, for example, the processor 202 of the device 200 determining whether certain process variables are currently being considered by the controller 106 in controlling the industrial process or have been dropped from consideration (such as by an operator). When a process variable is currently being used by the controller 106, this could also include the processor 202 of the device 200 identifying the actual operating mode for the process variable. Example operating modes could include a manual mode where the process variable is manually controlled by an operator, an automatic mode where the process variable is controlled by the controller, or a cascade mode (similar to automatic mode except the process variable's setpoint comes from an external source like another controller). This information can be relevant since some process variables may actually be designed to be dropped in certain modes of operation. This data could be obtained from any suitable source(s), such as directly from the model-based controller 106 or indirectly, such as via a historian 114, server 116, or gateway 120.

The process variables that have been dropped from the control matrix are identified at step 706. This could include, for example, the processor 202 of the device 200 identifying any process variables that the controller 106 was previously configured to use and that are not currently in the controller's control matrix. One of the dropped process variable is selected at step 708 and inserted back into the controller's control matrix at step 710. This could include, for example, the processor 202 of the device 200 selecting one of the dropped process variables and modifying the control matrix to indicate that the selected process variable is to be used to control the industrial process. A new value of the controller's objective function is calculated at step 712. This could include, for example, the processor 202 of the device 200 using the shadow optimizer to calculate the value of the controller's objective function using the modified control matrix. A difference between the new value of the controller's objective function and a prior value of the controller's objective function is identified at step 714, and the difference is used as the impact caused by a process variable mode issue at step 716. This could include, for example, the processor 202 of the device 200 calculating the difference between the objective function values and using this value as the cost of lost opportunity or other impact for the process variable mode issue.

If another dropped process variable remains to be processed at step 718, the method returns to step 708 to select and process another dropped process variable. The final results from the method 700 include an identification of impacts caused by process variable mode issues associated with process variables that have been dropped from consideration by a model-based controller 106.

Although FIGS. 4A through 7 illustrate example methods for performing operations in the method 300 of FIG. 3, various changes may be made to FIGS. 4A through 7. For example, while shown as a series of steps, various steps in each figure could overlap, occur in parallel, occur in a different order, or occur any number of times. Also, while specific operations and calculations have been described here, these relate to specific implementations of the operations in the method 300 of FIG. 3. Those operations in FIG. 3 could be performed in any other suitable manner.

Note that the techniques for identifying impacts of operational problems in advanced control operations described above could be used or operate in conjunction with any combination or all of various features described in the provisional patent applications incorporated by reference above and/or in the following concurrently-filed patent applications (all of which are hereby incorporated by reference):

U.S. Patent Application No. 62/518,352, entitled "APPARATUS AND METHOD FOR AUTOMATED IDENTIFICATION AND DIAGNOSIS OF CONSTRAINT VIOLATIONS";

U.S. Patent Application No. 62/518,397, entitled "APPARATUS AND METHOD FOR IDENTIFYING IMPACTS AND CAUSES OF VARIABILITY OR CONTROL GIVE-AWAY ON MODEL-BASED CONTROLLER PERFORMANCE"; and U.S. Patent Application No. 62/518,478, entitled "APPARATUS AND METHOD FOR IDENTIFYING, VISUALIZING, AND TRIGGERING WORKFLOWS FROM AUTO-SUGGESTED ACTIONS TO RECLAIM LOST BENEFITS OF MODEL-BASED INDUSTRIAL PROCESS CONTROLLERS".

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:
1. A method comprising:
obtaining data associated with operation of a model-based industrial process controller;
identifying at least one estimated impact of at least one operational problem of the industrial process controller, each estimated impact expressed in terms of a lost opportunity associated with operation of the industrial process controller;
presenting the at least one estimated impact to a user;
wherein the at least one estimated impact comprises an impact associated with one or more of:
noise or variance in process variables used by the industrial process controller;
misconfiguration of an optimizer in the industrial process controller;
one or more limits on one or more process variables used by the industrial process controller;
a quality of at least one model used by the industrial process controller;
a quality of one or more inferred properties used by the industrial process controller; and
one or more process variables being dropped from use by the industrial process controller;
wherein when the at least one estimated impact comprises an impact associated with noise or variance in process variables used by the industrial process controller, the identifying of the at least one estimated impact comprises:
for each of the process variables, (i) changing a current average value of the process variable to a steady-state value of the process variable and (ii) calculating a new value of an objective function associated with the controller using the changed average value of the process variable;
using a difference between a first of the new values of the objective function and a prior value of the objective function as the impact associated with noise or variance in one of the process variables; and
using changes between the new values of the objective function as the impacts associated with noise or variance in others of the process variables;
wherein when the at least one estimated impact comprises an impact associated with misconfiguration of an optimizer in the industrial process controller, the identifying of the at least one estimated impact comprises:
changing current average values of multiple process variables used by the industrial process controller to steady-state values of the process variables;
calculating a new value of an objective function associated with the controller using the changed average values of the process variables; and
using a difference between the new value of the objective function and a prior value of the objective function as the impact associated with the misconfiguration of the optimizer;
wherein when the at least one estimated impact comprises an impact associated with one or more limits on one or more process variables used by the industrial process controller, the identifying of the at least one estimated impact comprises:
for each limit:
changing a current value of the limit to an ideal value;

calculating a new value of an objective function associated with the controller using the changed value of the limit; and using a difference between the new value of the objective function and a prior value of the objective function as the impact associated with the limit;

wherein when the at least one estimated impact comprises an impact associated with a quality of at least one model used by the industrial process controller, the identifying of the at least one estimated impact comprises:

identifying a model error associated with the at least one model;

calculating a new value of an objective function associated with the controller using corrected gains or gain multipliers associated with the model error; and using a difference between the new value of the objective function and a prior value of the objective function as the impact associated with the quality of the at least one model;

wherein when the at least one estimated impact comprises an impact associated with a quality of one or more inferred properties used by the industrial process controller, the identifying of the at least one estimated impact comprises:

identifying at least one statistic of differences between predicted and laboratory values for the one or more inferred properties; and for each of multiple process variables used by the industrial process controller, (i) changing the process variable by a shift amount based on the at least one statistic, (ii) calculating a new value of an objective function associated with the controller using the changed value of the process variable, and (iii) using a difference between the new value of the objective function and a prior value of the objective function as the impact of the process variable on the quality of the one or more inferred properties;

wherein when the at least one estimated impact comprises an impact associated with one or more process variables being dropped from use by the industrial process controller, the identifying of the at least one estimated impact comprises:

for each of the one or more process variables:
adding the process variable to a control matrix associated with the controller;
calculating a new value of an objective function associated with the controller using the control matrix; and
using a difference between the new value of the objective function and a prior value of the objective function as the impact of the process variable being dropped from use by the industrial process controller.

2. The method of claim 1, wherein:
multiple estimated impacts are identified; and
at least some of the estimated impacts are presented in a ranked order.

3. An apparatus comprising:
at least one interface configured to receive data associated with operation of a model-based industrial process controller; and
at least one processor configured to:
identify at least one estimated impact of at least one operational problem of the industrial process controller, each estimated impact expressed in terms of a lost opportunity associated with operation of the industrial process controller;

present the at least one estimated impact to a user wherein the at least one estimated impact comprises an impact associated with one or more of:
noise or variance in process variables used by the industrial process controller;
misconfiguration of an optimizer in the industrial process controller;
one or more limits on one or more process variables used by the industrial process controller;
a quality of at least one model used by the industrial process controller;
a quality of one or more inferred properties used by the industrial process controller; and
one or more process variables being dropped from use by the industrial process controller;

wherein when the at least one estimated impact comprises an impact associated with noise or variance in process variables used by the industrial process controller, to identify the at least one estimated impact, the at least one processor is configured to:

for each of the process variables, (i) change a current average value of the process variable to a steady-state value of the process variable and (ii) calculate a new value of an objective function associated with the controller using the changed average value of the process variable;

use a difference between a first of the new values of the objective function and a prior value of the objective function as the impact associated with noise or variance in one of the process variables; and use changes between the new values of the objective function as the impacts associated with noise or variance in others of the process variables;

wherein when the at least one estimated impact comprises an impact associated with misconfiguration of an optimizer in the industrial process controller, to identify the at least one estimated impact, the at least one processor is configured to:

change current average values of multiple process variables used by the industrial process controller to steady-state values of the process variables;

calculate a new value of an objective function associated with the controller using the changed average values of the process variables; and use a difference between the new value of the objective function and a prior value of the objective function as the impact associated with the misconfiguration of the optimizer;

wherein when the at least one estimated impact comprises an impact associated with one or more limits on one or more process variables used by the industrial process controller, to identify the at least one estimated impact, the at least one processor is configured, for each limit, to:

change a current value of the limit to an ideal value;

calculate a new value of an objective function associated with the controller using the changed value of the limit; and use a difference between the new value of the objective function and a prior value of the objective function as the impact associated with the limit;

wherein when the at least one estimated impact comprises an impact associated with a quality of at least one model used by the industrial process controller, to identify the at least one estimated impact, the at least one processor is configured to:
  identify a model error associated with the at least one model;
  calculate a new value of an objective function associated with the controller using corrected gains or gain multipliers associated with the model error; and
  use a difference between the new value of the objective function and a prior value of the objective function as the impact associated with the quality of the at least one model;
wherein when the at least one estimated impact comprises an impact associated with a quality of one or more inferred properties used by the industrial process controller, to identify the at least one estimated impact, the at least one processor is configured to:
  identify at least one statistic of differences between predicted and laboratory values for the one or more inferred properties; and
  for each of multiple process variables used by the industrial process controller, (i) change the process variable by a shift amount based on the at least one statistic, (ii) calculate a new value of an objective function associated with the controller using the changed value of the process variable, and (iii) use a difference between the new value of the objective function and a prior value of the objective function as the impact of the process variable on the quality of the one or more inferred properties;
wherein when the at least one estimated impact comprises an impact associated with one or more process variables being dropped from use by the industrial process controller, to identify the at least one estimated impact, the at least one processor is configured, for each of the one or more process variables, to:
  add the process variable to a control matrix associated with the controller;
  calculate a new value of an objective function associated with the controller using the control matrix; and
  use a difference between the new value of the objective function and a prior value of the objective function as the impact of the process variable being dropped from use by the industrial process controller.

4. A non-transitory computer readable medium containing instructions that when executed cause at least one processing device to:
  obtain data associated with operation of a model-based industrial process controller;
  identify at least one estimated impact of at least one operational problem of the industrial process controller, each estimated impact expressed in terms of a lost opportunity associated with operation of the industrial process controller;
  present the at least one estimated impact to a user;
  wherein the at least one estimated impact comprises an impact associated with one or more of:
    noise or variance in process variables used by the industrial process controller;
    misconfiguration of an optimizer in the industrial process controller;
    one or more limits on one or more process variables used by the industrial process controller;
    a quality of at least one model used by the industrial process controller;
    a quality of one or more inferred properties used by the industrial process controller; and
    one or more process variables being dropped from use by the industrial process controller;
  wherein when the at least one estimated impact comprises an impact associated with noise or variance in process variables used by the industrial process controller, to identify the at least one estimated impact, the instructions when executed cause the at least one processing device to:
    for each of the process variables, (i) change a current average value of the process variable to a steady-state value of the process variable and (ii) calculate a new value of an objective function associated with the controller using the changed average value of the process variable;
    use a difference between a first of the new values of the objective function and a prior value of the objective function as the impact associated with noise or variance in one of the process variables; and
    use changes between the new values of the objective function as the impacts associated with noise or variance in others of the process variables;
  wherein when the at least one estimated impact comprises an impact associated with misconfiguration of an optimizer in the industrial process controller, to identify the at least one estimated impact, the instructions when executed cause the at least one processing device to:
    change current average values of multiple process variables used by the industrial process controller to steady-state values of the process variables;
    calculate a new value of an objective function associated with the controller using the changed average values of the process variables; and
    use a difference between the new value of the objective function and a prior value of the objective function as the impact associated with the misconfiguration of the optimizer;
  wherein when the at least one estimated impact comprises an impact associated with one or more limits on one or more process variables used by the industrial process controller, to identify the at least one estimated impact, the instructions when executed cause the at least one processing device, for each limit, to:
    change a current value of the limit to an ideal value;
    calculate a new value of an objective function associated with the controller using the changed value of the limit; and
    use a difference between the new value of the objective function and a prior value of the objective function as the impact associated with the limit;
  wherein when the at least one estimated impact comprises an impact associated with a quality of at least one model used by the industrial process controller, to identify the at least one estimated impact, the instructions when executed cause the at least one processing device to:
    identify a model error associated with the at least one model;
    calculate a new value of an objective function associated with the controller using corrected gains or gain multipliers associated with the model error; and use a difference between the new value of the objective function and a prior value of the objective function as the impact associated with the quality of the at least one model;

wherein when the at least one estimated impact comprises an impact associated with a quality of one or more inferred properties used by the industrial process controller, to identify the at least one estimated impact, the instructions when executed cause the at least one processing device to:

identify at least one statistic of differences between predicted and laboratory values for the one or more inferred properties; and for each of multiple process variables used by the industrial process controller, (i) change the process variable by a shift amount based on the at least one statistic, (ii) calculate a new value of an objective function associated with the controller using the changed value of the process variable, and (iii) use a difference between the new value of the objective function and a prior value of the objective function as the impact of the process variable on the quality of the one or more inferred properties;

wherein when the at least one estimated impact comprises an impact associated with one or more process variables being dropped from use by the industrial process controller, to identify the at least one estimated impact, the instructions when executed cause the at least one processing device, for each of the one or more process variables, to:

add the process variable to a control matrix associated with the controller;

calculate a new value of an objective function associated with the controller using the control matrix; and use a difference between the new value of the objective function and a prior value of the objective function as the impact of the process variable being dropped from use by the industrial process controller.

\* \* \* \* \*